United States Patent
Bishop

(10) Patent No.: US 6,543,326 B2
(45) Date of Patent: Apr. 8, 2003

(54) SAW TOOTH WITH FINISHING PROTRUSION

(76) Inventor: Ralph Carl Bishop, 2 Point La., P.O. Box 875, Shelter Island, NY (US) 11964

( * ) Notice: Subject to any disclaimer, the term of this patent is extended or adjusted under 35 U.S.C. 154(b) by 0 days.

(21) Appl. No.: 09/880,650

(22) Filed: Jun. 13, 2001

(65) Prior Publication Data

US 2003/0000362 A1 Jan. 2, 2003

(51) Int. Cl.[7] .............................................. B23D 57/00

(52) U.S. Cl. .......................................... 83/835; 83/592

(58) Field of Search ...................... 83/835, 592; 125/15

(56) References Cited

U.S. PATENT DOCUMENTS

| 3,092,094 A | * | 6/1963 | Griffin et al. | 125/15 |
| 4,267,814 A | * | 5/1981 | Benson et al. | 125/15 |
| 5,184,597 A | * | 2/1993 | Chiuminatta et al. | 125/15 |
| 5,441,033 A | * | 8/1995 | Chiuminatta et al. | 125/15 |
| 5,794,503 A | * | 8/1998 | Asada | 83/835 |

* cited by examiner

Primary Examiner—Derris H. Banks
Assistant Examiner—Jamila Williams

(57) ABSTRACT

A protrusion on the side of the saw tooth rubs against the newly cut kerf surface as the tooth cuts. Pressure, friction and friction-generated heat are produced through this rubbing action. The confluence of this pressure, friction, and heat, performs a polishing action against the newly cut kerf surface.

7 Claims, 4 Drawing Sheets

SAW TOOTH WITH FINISHING PROTRUSION

CROSS REFERENCE TO RELATED APPLICATIONS

This invention gives saw teeth the means for transmitting pressure, friction, and heat, to kerf surfaces. It relates to saw teeth. My co-pending application, Ser. No. 09/634,301, Cnfrm No. 5053, Filing Date Aug. 8, 2000, also provides for the transmission of pressure, friction, and heat, to kerf surfaces, but, in contrast it relates to saw blades.

STATEMENT REGARDING FEDERALLY SPONSORED RESEARCH AND DEVELOPMENT

Not applicable

REFERENCE TO A MICROFICHE APPENDIX

Not applicable

BACKGROUND OF THE INVENTION

Saw teeth, the cutting instruments at the leading edges of saw blades, serve only to cut into the material addressed. The teeth, in motion with the blade, through a series of controlled superimposed scratches and scrapes, generate a cutting action. The newly cut kerf surfaces are not subjected to any finishing treatment by the saw teeth. The saw teeth create kerfs no smoother than their scratch scrape action allows.

Until my invention I have not heard of, or seen, or found a record of saw teeth with design elements giving them the means to polish as well as cut.

BRIEF SUMMARY OF THE INVENTION

In accordance with the present invention, the configuration of the saw tooth would include a protrusion on the side of the tooth nearest to the kerf. The prior art cutting edge of the tooth performs a conventional cutting action. The protrusion at the side of the tooth simultaneously rubs against the newly cut kerf surface. This rubbing action generates pressure, friction, and friction-generated heat, against the newly cut kerf surfaces. The confluence of pressure, friction, and heat, has a polishing effect that produces flatter smoother and denser kerf surfaces than could be produced by the teeth's scratch scrape action alone.

BRIEF DESCRIPTION OF SEVERAL VIEWS OF THE DRAWINGS

FIG. 4 is a view in detail of the portion of the saw tooth indicated by the designation 4 in FIG. 1a.

FIG. 5 is a view in detail of the portion of the saw tooth indicated by the section lines 5—5 in FIG. 2a.

DETAILED DESCRIPTION OF THE INVENTION

Figure 1:
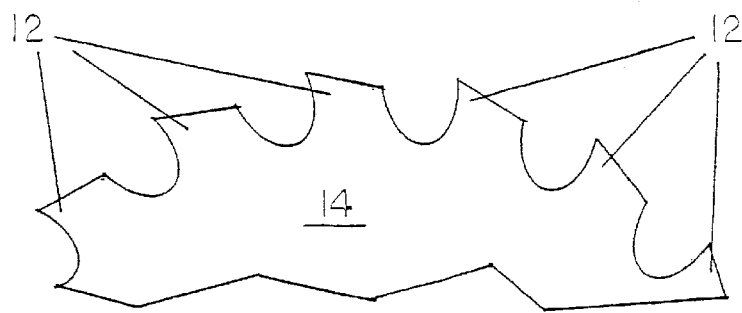
FIG. 1 is a partial view of the side of a prior art circular saw blade.
Figure 1A:
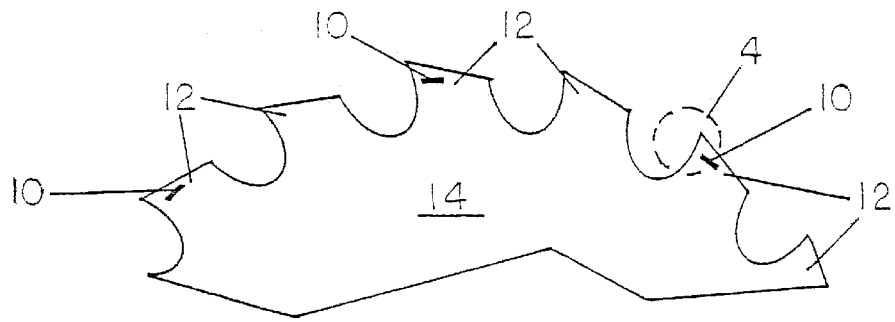
FIG. 1a is a partial view of the side of a circular saw blade including a protrusion on the side of each second tooth, according to this invention.
Figure 2:
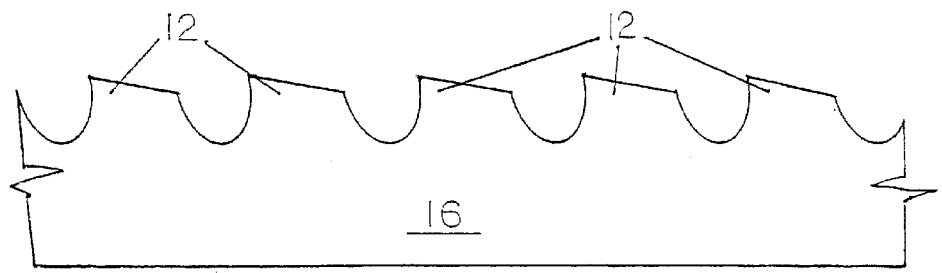
FIG. 2 is a partial view of the side of a prior art band or straight saw blade.
Figure 2A:
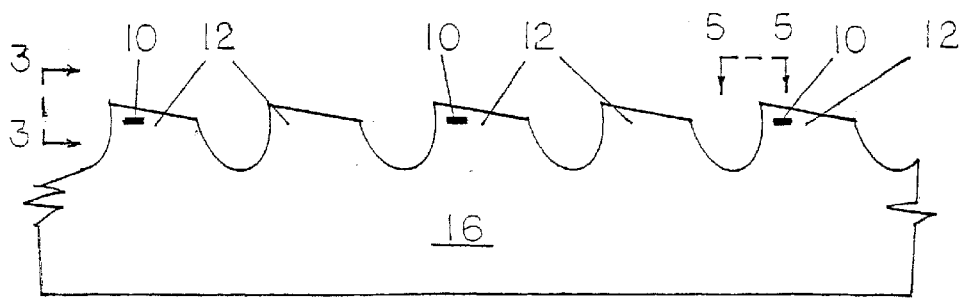
FIG. 2a is a partial view of the side of a band or straight saw blade including a protrusion on the side of each second tooth, according to this invention.

The protrusions 10 of FIGS. 1a and 2a illustrate protrusions 10 near the cutting edges of prior art saw teeth 12 on a prior art circular saw blade 14 and a prior art band or straight saw blades 16.

Figure 3:
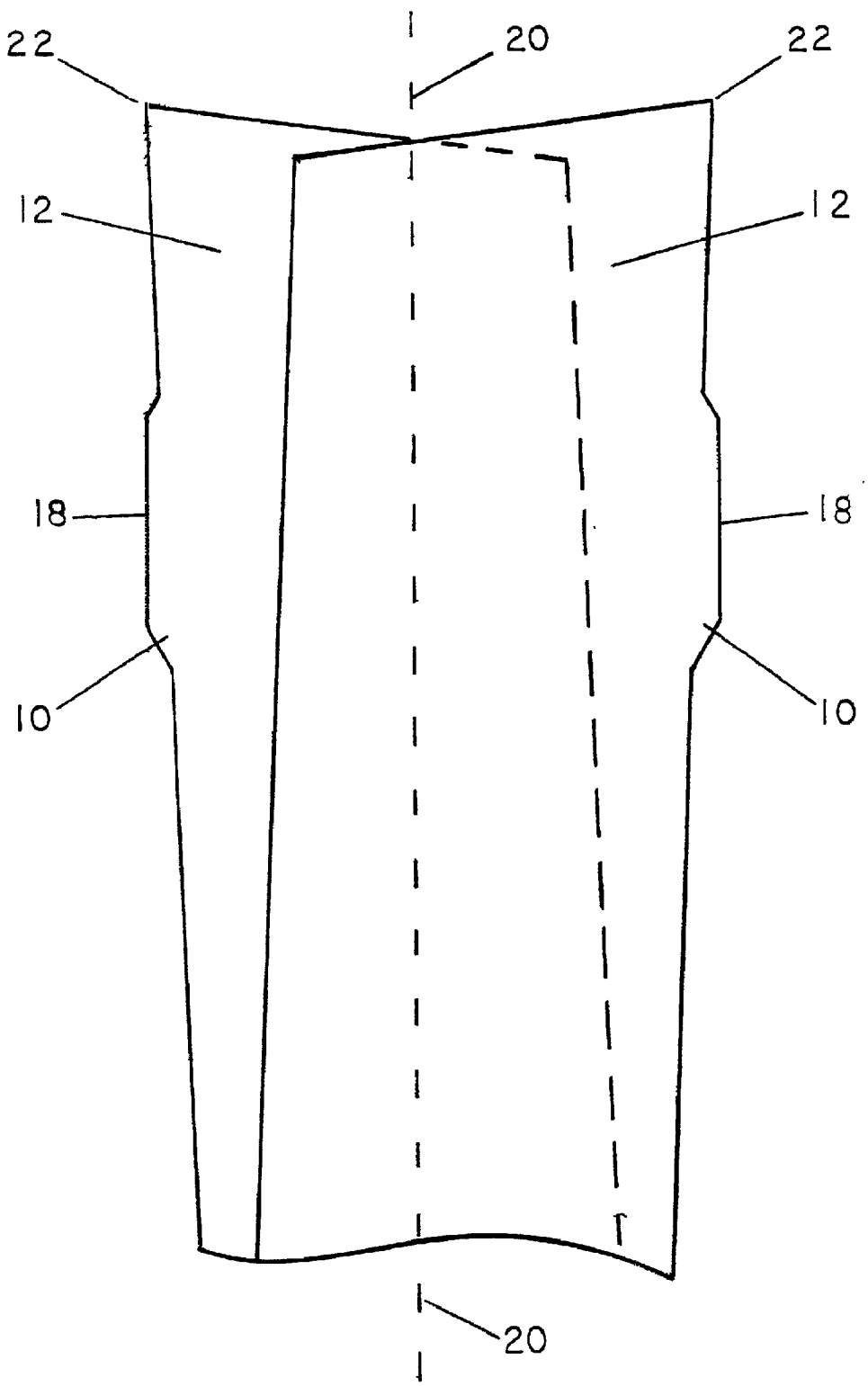
FIG. 3 is a view in detail of the portion indicated by the section lines 3—3 in FIG. 2a. of two saw teeth.

FIG. 3 illustrates protrusions 10 on the sides of two teeth 12 with the surfaces of engagement of the protrusions 18 positioned slightly further laterally from the center plane of the saw blade 20 than the extreme lateral projection of the cutting edge of the teeth 22. Each tooth has one protrusion 10 and that on the side nearest to the kerf produced by that tooth. The protrusion 10 is an inherent part of the tooth 12 and is of the same material as the tooth.

Figure 4:
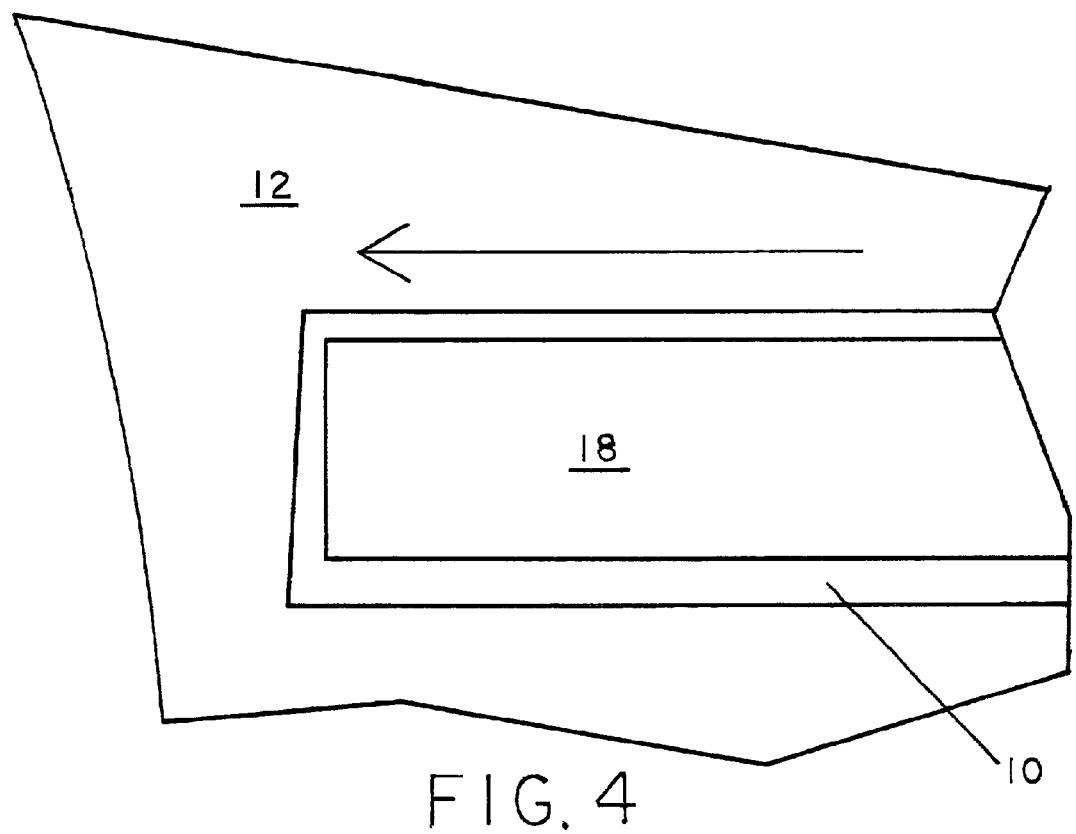
Figure 5:
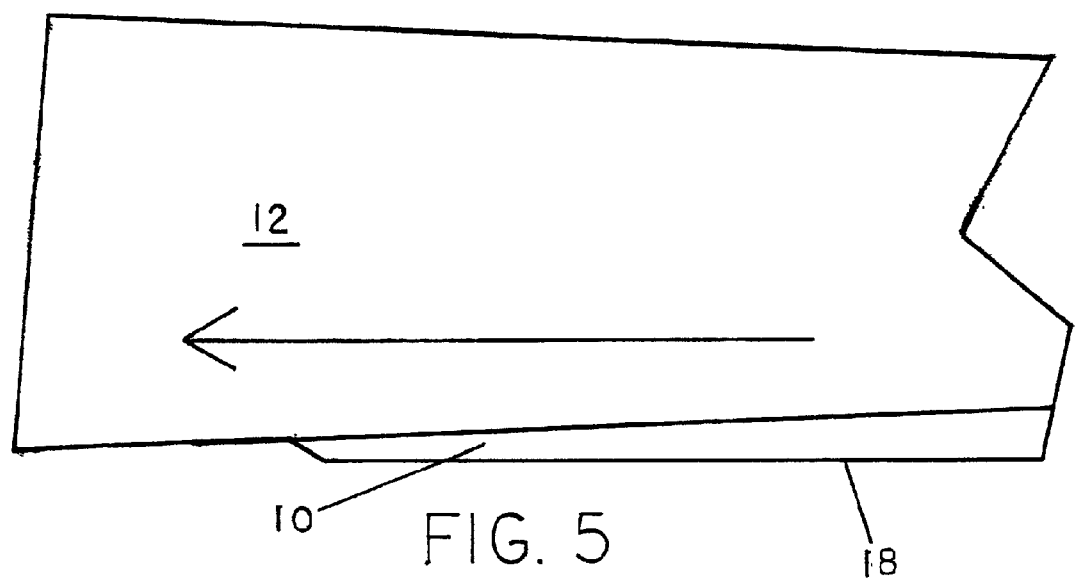

FIGS. 4 and 5 illustrate a saw tooth 12 with the protrusion's 10 surface of engagement 18 flat and parallel to the thrust of the cut.

Figure 6:
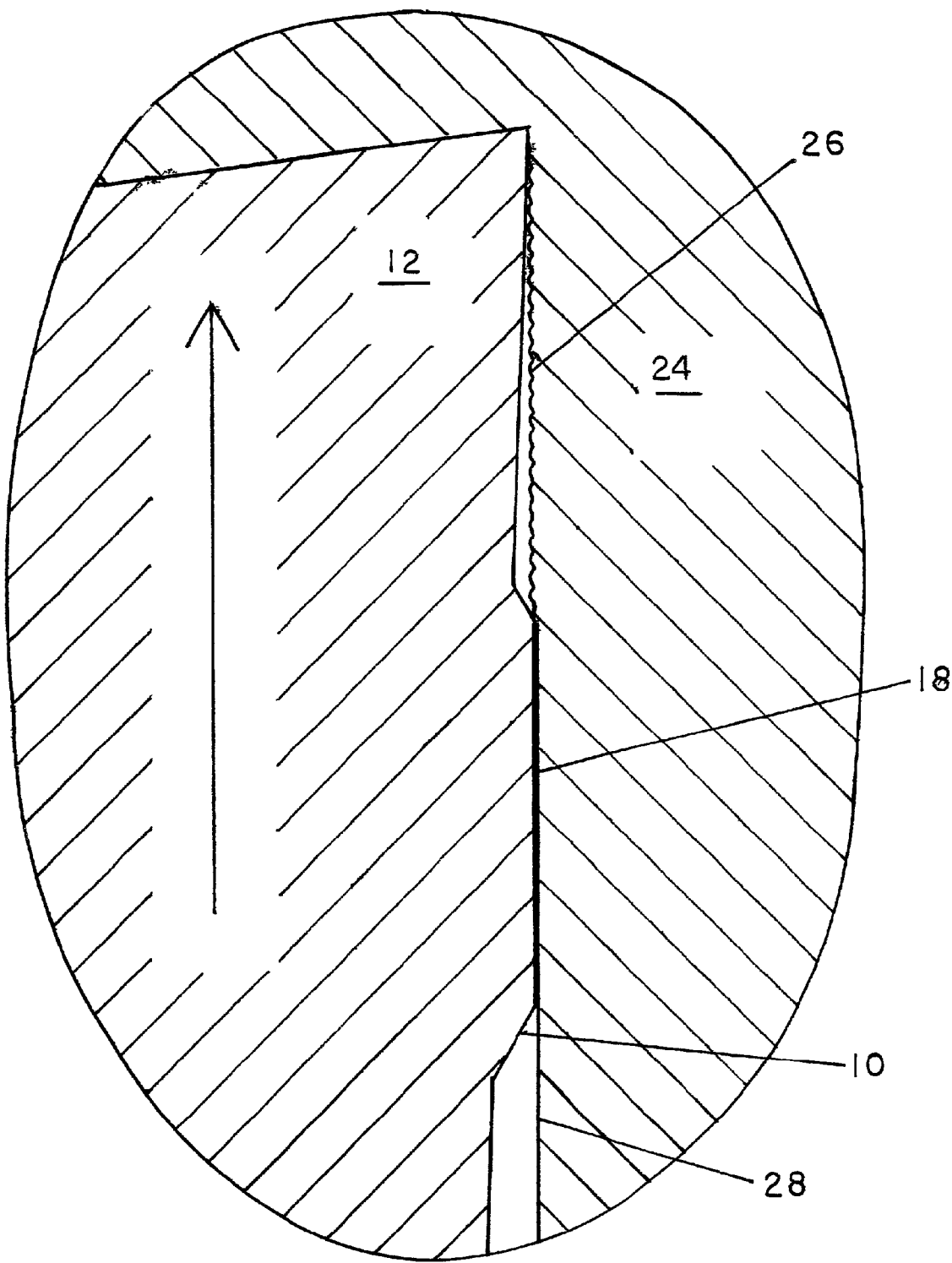
FIG. 6 is a view in detail of a saw tooth advancing into material it is cutting, according to this invention.

FIG. 6 is an illustration of a saw tooth 12 advancing into material being cut 24. The surface of engagement 18 of the protrusion 10 rubs against the coarse kerf surface 26 producing a smoother kerf surface 28. The protrusion 10 is an inherent part of the tooth and is of the same material as the tooth.

OPERATION

With the foreword motion of the blade generating pressure against the material addressed 24 the saw teeth 12 perform a scratch scrape cutting action. The protrusions 10 project slightly further laterally from the center plane of the saw blade 20 than the extreme lateral projection of the cutting edge of the saw teeth 22. Simultaneous to the cutting action said protrusions rub against the newly cut Keri surfaces 26. This rubbing generates pressure, friction, and friction-generated heat. The confluence of these elements perform a polishing action against the newly cut Keri surfaces 26.

Accordingly, the reader will see that the protrusions of this invention are a practical addition to the design of saw teeth. These protrusions enable saw teeth to produce a smoother cut than would be possible without them.

Although the description above contains specificity's, these should not be construed as limiting the scope of the invention but as merely providing illustrations of a presently preferred embodiment of this invention. For example:

The design of the protrusions and their surfaces of engagement may include elements chosen from a plurality of design characteristics relating to composition, configuration, texture, and location.

Thus the scope of this invention should be determined by the appended claims and their legal equivalents, rather than by the examples given.

| REFERENCE NUMBERS | |
|---|---|
| 10 | protrusion at the side of the saw teeth |
| 12 | prior art saw teeth |
| 14 | saw blade, circular |
| 16 | saw blade, band or straight |
| 18 | protrusions' surface of engagement |
| 20 | center plane of saw blade |

-continued

REFERENCE NUMBERS

| | |
|---|---|
| 22 | most lateral projection of the tooth's cutting edge |
| 24 | material being cut |
| 26 | coarse kerf |
| 28 | smooth kerf |

What I claim as my invention is:

1. In the process of a saw tooth with a sharp forward positioned cutting edge advancing into the material addressed with a scratch scrape action, the improvement wherein the side of the tooth having a bevel edged flat surfaced protrusion distinct from said tooth's cutting edge, with said protrusion projecting slightly further laterally from the center plane of the saw blade than a most lateral projection of the sharp forward positioned cutting edge, with said protrusion projecting laterally far enough for its surface of engagement, wherein said protrusion has a working surface, to generate a rubbing action against the kerf surface that has been freshly cut by the forward positioned cutting edge of the saw tooth, but not projecting far enough laterally to cut into the kerf, with said rubbing action of said protrusion's working surface generating pressure, friction, and friction-generated heat, against said kerf surface, whereby said protrusion serves as a finishing element rendering said kerf surface smoother, flatter, and denser.

2. A protrusion as recited in claim 1 in which the working surface is interspersed with one or more concave depressions.

3. A protrusion as recited in claim 1 in which the working surface is impregnated with an abrasive material.

4. A protrusion as recited in claim 1 in which the protrusion is an elemental part of the saw tooth created with the tooth as it was machined.

5. A protrusion as recited in claim 1 in which the protrusion is not of the same material as the saw tooth.

6. A protrusion as recited in claim 1 in which the protrusion is attached to the saw tooth by means selected from the group consisting of welding, and brazing, and riveting, and screwing.

7. A protrusion as recited in claim 1 in which its working surface has been submitted to a treatment selected from the group consisting of plating, and polishing, and case hardening.

* * * * *